H. W. WARNER.
Carriage-Tops.
No. 157,657.  Patented Dec. 8, 1874.
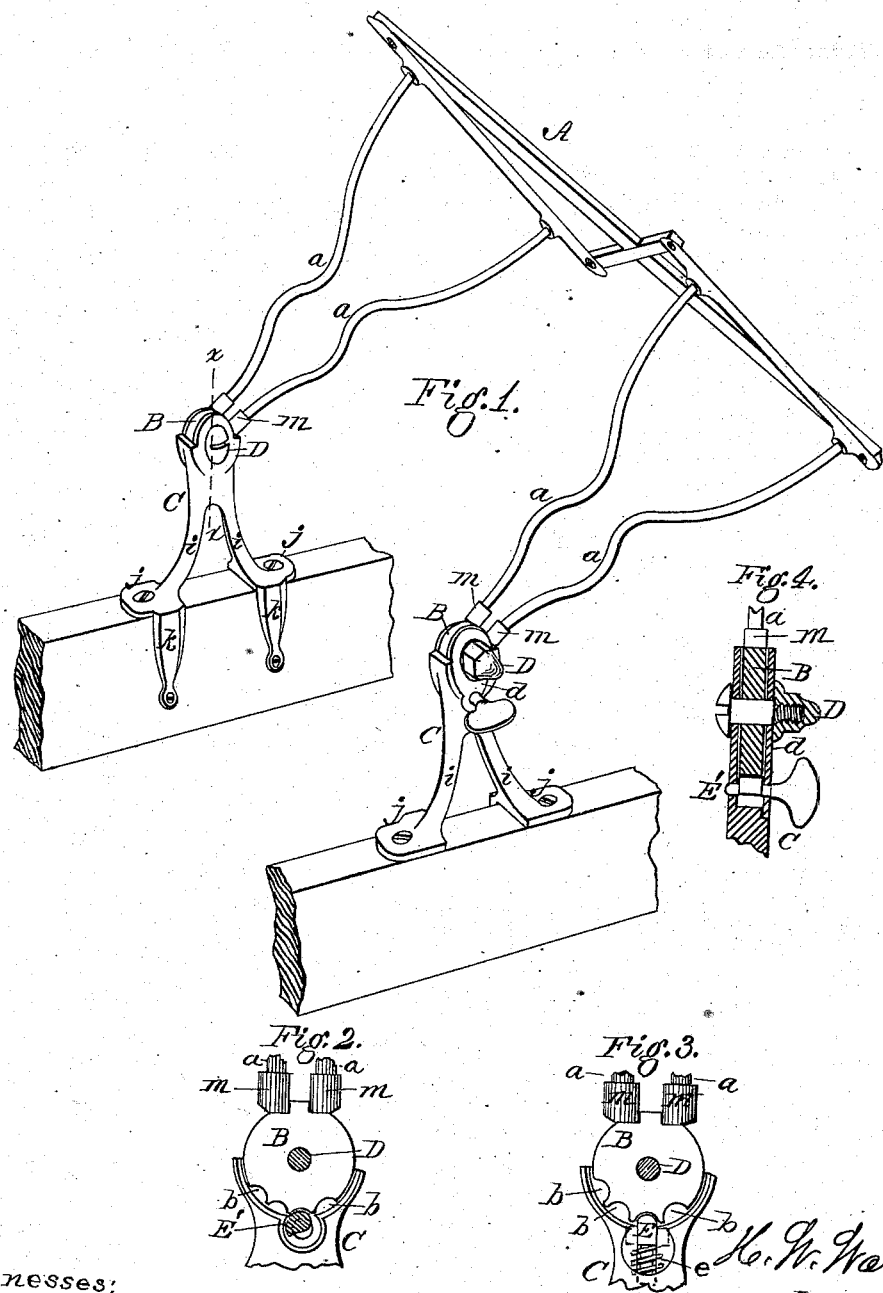

UNITED STATES PATENT OFFICE.

HENRY W. WARNER, OF GREENFIELD, MASSACHUSETTS.

IMPROVEMENT IN CARRIAGE-TOPS.

Specification forming part of Letters Patent No. 157,657, dated December 8, 1874; application filed July 27, 1874.

*To all whom it may concern:*

Be it known that I, HENRY WARREN WARNER, of Greenfield, in the county of Franklin and State of Massachusetts, have invented certain Improvements in Carriage-Tops, of which the following is a specification:

My invention relates to what are known as canopy-tops, which are arranged to turn down in front or rear at will; and it consists in a novel manner of locking the same in position, in the use of a friction-lock on one side and a dead-lock on the other, and in making the top-frame above the joint of bent wires or rods, having their lower ends secured together.

Figure 1 is a perspective view of my top; Figs. 2 and 3, sectional views of the same, showing two forms of the locking-dog; and Fig. 4, a transverse central section of the joint on the line $x$ $x$.

A represents the top or canopy, made as usual, with two or more converging arms, $a$, on each side to give it support, the arms being hinged to the carriage in the manner following. Each pair of arms is secured rigidly to the upper edge of a vertical circular disk, B, the edge of which is provided with a series of notches, $b$. Two short standards, C, are secured to the sides of the carriage, and provided in their upper ends with sockets or recesses, in which the disks B are inserted, and secured by central bolts D, forming pivots on which the disks and the top A turn. In each standard C, below its disk B, there is mounted a locking-dog, E or E', which engages in the notched edge of the disk to hold it from turning, and thereby keep the top A in the required position. By locking the dog in one or another of the notches the top A may be held in any position required, either in front or in rear of the carriage-seat. On one side of the top I employ a sliding bolt, pushed upward by a spiral spring, $e$, as shown in Fig. 3, the upper end of the bolt bearing in the notched edge of the disk with sufficient force to retain the top in position, while at the same time it will yield and permit the top to move under a strong pull. On the other side of the top I employ a dead-lock, consisting of an eccentric dog provided with a protruding thumb-piece, as shown in Figs. 1, 2, and 4, by means of which the dog may be turned, and caused to lock firmly into the notched edge of the disk. This arrangement holds the top securely in position, and gives the operator the free use of one hand to adjust the top while using the other to operate the eccentric or dead-lock, the spring bolt or dog serving to check the movement of the top at the proper points, to permit the engagement of the eccentric locking-dog.

The second part of the invention relates to the manner of constructing the sides of the canopy top or frame, in order to render it light and cheap; and it consists in making the sides of the same of wires or rods, having their lower ends united by insertion into sockets $m$, cast on the disks B, or by riveting, soldering, or otherwise securing them together. Heretofore it has been the general custom to cast each side of the canopy frame or top with its two or more arms in one piece, and to then finish and polish it up by hand. This hand-finishing, which was a necessity with the cast arms, adds materially to the cost of the tops, and interferes with their sale.

It is to overcome the necessity for the hand labor, and to cheapen and lighten the top, that I adopt the plan of making the side arms of wire or rods, polished and finished by machinery, and then simply cut and bent as required, and united at the lower ends.

The employment of the wires or rods renders the frame or top materially lighter and cheaper, and far more pleasing in appearance, than those of the ordinary construction. The arms $a$ may be made separately, and inserted into cross-bars at the top, or each wire or rod may be bent in such manner that its ends will form two arms. Their lower ends may be inserted into sockets $m$ cast on the disks B, or they may be welded, riveted, or soldered together, and then secured to the disk or other hinge in any suitable manner.

It is obvious that a canopy-top may be provided with a spring or friction lock on one side, and a dead-lock on the other, of different construction from that shown. This part of my invention consists in the combination of the two forms of lock with one cover, and not in the precise construction of the locks.

In constructing the standards their upper ends may be made solid, with the recess therein; or, as shown in Figs. 1 and 4, the recess may be made in the side, and then closed, after the insertion of the disk, by a plate, $d$, seated in the standard, and held in place by the pivot bolt.

It will be observed that the standards each have two diverging legs, $i$, each of which is provided with an ear, $j$, fitting on top of the body, and with a depending ear, $k$, fitting down inside of the body, as shown in Fig. 1. It will also be noticed that the two legs are not connected at the lower ends, and that there is a clear, open space between them. This construction permits the standard to be finished on a polishing strap or belt, and renders them much cheaper and easier to finish than the common form, in which the legs are connected by a strap or plate.

It is obvious that, in making my hinge-joint, the parts may be reversed, and the disk formed on the standard, and the locking-dog attached to the top.

My invention is intended more especially for children's carriages, but is of course also applicable to others.

I am aware that canopy and other carriage tops have been provided with locks and catches of various kinds; but I am not aware that an eccentric dog has been used with a notched disk, nor that a dead-lock and a spring-lock have been employed on opposite sides of one top.

Having thus described the invention, what I claim is—

1. In combination with the notched disk B, secured to the top A, and pivoted to the carriage, the eccentric locking-dog E, as shown and described.

2. In combination with a carriage-top, a friction or spring lock on one side of the same, and a dead-lock on the other side, substantially as and for the purpose described.

3. In combination with the disks B, having the sockets $m$ thereon, the wire arms $a$, secured in the sockets, as set forth.

HENRY W. WARNER.

Witnesses:
SAMUEL O. LAMB,
J. H. SANDERSON.